United States Patent [19]

Spiel

[11] 4,119,734
[45] Oct. 10, 1978

[54] HIGH PROTEIN RICE MIXTURE

[75] Inventor: Albert Spiel, Yonkers, N.Y.

[73] Nabisco, Inc., East Hanover, New Jersey

[21] Appl. No.: 660,869

[22] Filed: Feb. 24, 1976

[51] Int. Cl.² .............................................. A23L 1/20
[52] U.S. Cl. ..................................... 426/72; 426/311; 426/618; 426/634
[58] Field of Search .................. 426/634, 618, 72, 311

[56] References Cited

U.S. PATENT DOCUMENTS

| | | | |
|---|---|---|---|
| 2,162,729 | 6/1939 | Levenson et al. | 426/468 |
| 3,485,636 | 12/1969 | Hoffman | 426/634 |
| 3,620,755 | 11/1971 | Hoffman | 426/634 X |
| 3,899,609 | 8/1975 | Lonneker et al. | 426/656 X |
| 3,912,824 | 10/1975 | Spiel | 426/634 X |
| 3,920,852 | 11/1975 | Haas | 426/656 X |

FOREIGN PATENT DOCUMENTS 489,127  7/1938  United Kingdom ..................... 426/618

OTHER PUBLICATIONS

Hafner, Edible Soy Flour and Soy Grits, The Soybean Digest, vol. 19, No. 8, Jun. 1959, pp. 8-9.
Perry, Chemical Engineers' Handbook, 3rd Ed., 1950, McGraw-Hill Book Co., Inc., New York, p. 1221.

*Primary Examiner*—Joseph M. Golian
*Attorney, Agent, or Firm*—Fisher, Christen & Sabol

[57] ABSTRACT

A protein-enriched rice food product of substantially uniform density in the dry state composed of particulate soy protein and rice grains wherein the particulate soy protein particles have a density substantially equivalent to that of rice whereby the protein-rice product can be packaged without segregation of the product mix. The soy protein particles have suitable hydration properties such that the subsequent preparation of the particulate protein-rice food product resembles that of rice.

19 Claims, No Drawings

HIGH PROTEIN RICE MIXTURE

BACKGROUND OF THE INVENTION

The present invention relates to a novel soy protein-enriched rice food product of substantially uniform density which is composed of particulate soy protein and rice grains wherein the particulate soy protein particles have a density substantially equivalent to that of rice whereby the protein-rice product can be packaged and shipped without segregation of the soy particles and the rice.

As is well known there is a critical shortage of rice which is the primary staple of the diet of many peoples, particularly the people of Asia. Additionally, it is well known that rice is primarily a carbohydrate type of food and thus is lacking in protein.

Previous attempts to fortify rice or produce an enriched artificial rice have not been too successful in that fortification procedures tend to produce objectionable discolorations of the rice and processes for the production of an enriched artificial rice fails to produce a product having suitable hydration properties such that preparation of the product is uniform and resembles that of rice.

Accordingly, it is a primary object of this invention to produce a protein-enriched rice food product of substantially uniform density, in the dry state, composed of particulate soy protein and rice grains wherein the particles of soy protein have a density substantially equivalent to that of rice whereby the protein-rice product can be packaged and transported without segregation of the product mix and wherein the soy protein particles possess suitable hydration properties such that the subsequent preparation of protein-enriched rice food product resembles that of rice.

Another object of the invention resides in the provision of an improved process which increases the protein nutrition of rice.

Yet another object of the invention resides in the provision of a protein-enriched rice food product which permits vitamin and mineral fortification of rice without any objectionable discolorations of the rice.

Still another object of the invention resides in the provision of an improved protein-enriched rice food product which permits the incorporation of protein supplements into rice, in the dry state, without segregation in the package.

Still further objects of the invention will become more immediately apparent as the following description of the invention proceeds.

In accordance with the present invention the aforementioned objects of the invention are readily accomplished by incorporating or blending with rice a particulate soy protein of substantially the same density as rice, said particulate soy protein having hydration properties such that subsequent preparation of the soy protein-rice food product for consumption is uniform and resembles that of rice.

The soybeans which can be converted to soybean particulates having desired densities and hydration properties can be any of the several varieties of soybeans such as Lincoln soybeans and the like. Soybeans contain small amounts of enzymes, for example, urease and lipoxidase, and inhibitors, such as hemaglutin and antitrypsins. All are inactivated by the moist heat used in the processing steps herein. Also, the proteinaceous plant (soybean) material used herein usually contains such amino acids as arginine, histidine, lysine, tyrosine, tryptophane, phenylalanine, threonine, methionine, cystine, leucine, isoleucine, valine, glycine, and/or glutamic acid. The primary protein of soybean is glycinin, which is a mixture of short and long molecules made up in part of various amino acids. The soybean material also contain carbohydrates, ash, fibrous and pulpy constituents and associated flavoring ingredients.

The soybeans are usually processed to prepare soybean meal by the following sequence of steps, all of which are within the skill of those ordinarily skilled in the art: magnetic separation; bean cleaning, been cracking (cracking rolls); dehulling, but the hulls can then be used as part of the feed; tempering, flaking; oil-extraction; and grinding. (Hulled or dehulled soybeans can be used in this invention. Also, defatted or full-fat soybean flour can be used as feed in this invention). The soybeans used as feed in the screw press are first conventionally particulated into meal, grits, flour, flakes or similar material, and the particulated material is conventionally processed using conventional solvent-extraction schemes to remove the oil. The most frequently used solvent is hexane, but examples of other volatile, nonpolar, oil solvents which can be used are pentane, heptane and benzene. Also, mixed solvents can be used, such as volatile, nonpolar, oil solvents, 1 to 10 percent water and volatile, polar organic solvents, such as acetone, the lower alcohols (like methanol, ethanol and propanol).

The particulated material is desolventized and/or deodorized by known techniques involving the application of heat, the degree of which affects the protein solubility range usually expressed in NSI or PDI, respectively. Nitrogen Solubility Index and Protein Dispersability Index (AOCS Test BA 10-65) which are standard tests of the American Oil Chemists Society. A suitable range of NSI for the particulated material used herein extends from about 30 to about 70, preferably 45 to 60. Too low of an NSI or PDI provides a mass which is too loose for suitable compaction and leaching and too high of an NSI results in a highly compacted chunk which is relatively difficult to hydrate and/or rehydrate.

The particulated material (preferably flakes) which contains some moisture, is then subjected to a pressure of at least 1,800 pounds per square inch for a time and at a temperature sufficient to convert moisture into steam. The material is partially disembittered, toasted without scorching, and compacted into a hard and substantially fused mass.

The pressure used is at least 1800 p.s.i., generally between about 2000 and about 5000 p.s.i. and preferably between about 2000 and 3000 p.s.i. (The vast majority of the oil has been already removed from the soybean, so usually less than one percent by weight of oil remains in the soybean feed.) One reason why pressures between 2000 and 3000 pounds per square inch are preferred is that less energy is generated which results in less chance of scorching the product. Pressures below those specified result in chunks that are too loosely compacted, require extremely long times to achieve any degree of disembittering. Pressures in the above range result in a compacting and plasticizing of the material whereby a cake is formed in which the dust and any hulls are uniformly combined with the rest of the material. The plasticizing action during the pressure and heat treatment causes the cake to be substantially uniform, in which the fines and hulls are intimately held. The cake can therefore be fragmented into chunks which remain cohesive enough to be a commercial product which retains its size and shape even though subjected to boiling water and stirring.

The hydration properties of the chunks of this invention can be controlled by controlling the compaction process. In general, the higher the degree of compaction, the slower the rate of hydration and the higher the density. The reverse is also true, i.e., the lower the degree of compaction the faster the rate of hydration and the lower the density. The rate of hydration can be further increased and the density decreased by extracting the chunks with water and drying before mixing with rice. Insufficient compaction, e.g., at pressures below about 1800 p.s.i., or too low protein solubility, produces chunks that tend to form a mush or gruel upon hydration.

The moisture content of the material should be between about 5 and about 10 percent when it is fed into the equipment wherein it will be subjected to at least 1800 pounds per square inch. The reason for this is that that much moisture is necessary to obtain partial or substantial disembittering by steaming in such equipment (i.e., the moisture is converted therein into steam). If too much moisture is present, scorching of the product will occur or uneven toasting will result. If the moisture content of the soybean material is too high, the portions of the meal away from the source of the heat will not be toasted, or if sufficient heat and pressure are applied to toast the portions away from the source of heat, those portions in juxtaposition to the source of heat will be scorched or burned.

The period of time of processing the soybean material at the stated pressure is normally between about 1.5 and about 5 minutes to obtain the desired results. Preferably the time period is 3 minutes.

The soybean material can be treated by any conventional means which will produce the desired results. For example, a press plate having heated plates can be used.

The desired results are preferably obtained by the use of a modification of a screw press of the type disclosed in U.S. Pat. No. 731,737 (incorporated herein by reference) and customarily referred to in the art as an "Anderson expeller." The outer casing surrounding the screw does not contain the series of holes, as for example the oil has already been removed from the particulate soybean feed by an appropriate method. The modified Anderson expeller includes a preconditioning chamber which is, for example a 14 inch wide by 14 feet long steamjacketed continous ribbon blender. Next in the process line is a vertical force feeder which conveys the particulate soybean material to the main horizontal pressing chamber. The main horizontal pressing chamber has been modified by replacing the barrel spacing bars with solid polished plates. Also the main press worm (screw) has been modified by sliding a tapered cone along the shaft into the pressed cake outlet space to increase the internal pressure along the press worm and to obtain uniform, thin, compacted material (usually about ⅜ inch thick). All internal surfaces of the press subjected to contact with the soy material or compacted material are hardened and highly polished for smooth flow of the material through the press.

The press is normally set so that the thickness of the resulting cake (mass) is about one-fourth to three-eighth inch, but this thickness is not critical and is only desirable.

The screw press can be modified by the addition of heating coils around the outer wall of the screw press casing housing the rotatable screw as to uniformly heat the casing in such regions. This is normally not done when the soybean particles have been preheated in a preconditioning chamber. (Any other heating arrangement can be used.)

The desired temperature of the soybean material during the pressing is about 150° to about 200° C. (about 302° to about 392° F.), so the inner casing wall should not have a temperature which will cause the temperature of the soybean material to rise above about 200° C. or else the soybean material will become scorched. The pressure in the press will convert the moisture into steam, but not all of the energy produced will be used in vaporizing the moisture—some will go to generally raising the temperature of the soybean material. If properly done within the limits set forth herein the resulting cake (mass) will not be scorched. Some degree of disembittering is obtained by the steam thusly produced, but the cake (mass) still has a degree of bitterness or beany flavor and has a nutty flavor. The look, taste, chewability, blandness, meatlike texture and general characteristics of the meat-like product have not been obtained at this point in the processing of the soybeans.

As previously stated, the temperature of the soybean material should be between about 150° and about 200° C., and preferably 165° to 180° C. This assures partial or substantial disembitterment without scorching. The soybean material can be preheated, before being fed into the pressure-treated equipment, to a temperature between about 160° and 200° F. Soybean material which contains too high of a moisture content can be preheated and dried to the proper moisture content in a tempering chamber before being fed into the pressure equipment. When equipment like a press plate having heated plates is used, the soybean material is first placed therein and allowed to stand in order to preheat the material.

The mass obtained from the screw press or other equivalent processing equipment is fragmented by any convenient means. Examples of such means are chopping blades and crushers. The resulting chunks are sized so that they have a more uniform size range. For example, four suitable portions of different but individually uniform size ranges include chunks that:

| Pass through a screen having openings of | But are retained on a screen having openings of |
|---|---|
| 1 inch | ½ inch |
| ½ inch | No. 4* |
| No. 4* | No. 10* |
| No. 8* | No. 20* |

*U. S. Mesh sizes

Preferred chunks pass through a 1 inch opening screen and stay on a ½ inch opening screen. The over and under sized material can be removed. The resulting chunks are light yellowish brown or buff in color and are relatively nonporous.

The soy protein particulate material produced in accordance with above described process can also be shaped to resemble known food components commonly used with rice around the world. These shapes can resemble the rice grains themselves, wheat, barley, soybeans, corn, meat, poultry or fish granules and other components indigenous to various countries around the world.

The soy protein-rice particulate ratio is not necessarily a critical feature of the invention and can be varied over a wide range and tailor made to meet or satisfy specific protein requirements of various nutritional food recipes or satisfy specific protein requirements of various peoples. In general the amount of soy protein to rice grains can be varied from about 5.0 to 100 percent by weight of soy protein based on the weight of the rice grain.

If desired, flavoring systems including flavor enhancers and/or agents can be added to the soy protein particulates prior to their combination with rice granules. In general, such flavoring systems are not necessary, but, if desired, such flavoring systems are employed in amounts of from about 0.1 to 2.0 percent by weight of the soy protein particulate matter. Examples of such flavor enhancers are monosodium glutamate, disodium inosinate and disodium quanylate. Also, if desired, flavoring agents in the amount of from 10 to 20 percent by weight based on the weight of the soy protein can be added.

The soy protein-enriched rice can be readily nutritionally enhanced by the fortification of the soy protein being compacted in the compactor or modified Anderson screw press or expeller with vitamins and/or minerals to provide specific fortification levels depending upon the intended use before mixing the compacted soy particles or chunks with the rice. This means of fortification of the soy protein particulates is quite advantageous since any color effects induced by such fortification can be more suitably masked in the soy protein particulates than in the rice granules, particularly white rice granules. The amounts of vitamin or mineral supplements which can be normally employed are amounts which are recognized in the art with respect to other fortified materials such as cereals, breaks and the like.

As pointed out above the control of the density of the textured soy protein particles to be substantially that of the rice granules is of utmost importance in achieving soy protein-enriched rice food product mix which can be supplied in multiwall bags or fiber drums and which will withstand prolonged transportation without segregation of either of the ingredients, that is the soy protein particulate material and the rice granules. Density control is achieved by the choke or tapered cone mounted in the pressed cake outlet. Movement of the cone in one direction reduces the outlet size and increases the pressure in the press, thus increasing the density of the compacted soy, whereas movement in the opposite direction increases the outlet size and decreases pressure thus providing compacted soy of less density.

In order to determine the suitability of various blends of soy protein and rice grains as to their suitability for transportation without separation of ingredients various uniformly blended premixes of same are subjected to a simulated transportation test to determine densification and determine the distribution of the soy protein in the soy-protein-rice mixture. The densification test includes filling a 100 ml graduated cylinder with a blended mixture of soy protein particulate matter and rice grains. The cylinder is tamped gently 50 times. Observations are then made of the distribution patterns of the mixture of materials. If it is observed that no separation occurs between the soy protein and the rice grains it illustrates that the substantially equal densities of the soy protein particulates and the rice granules achieve one of the primary objects of the invention. Thus, by choosing the proper density of the soy protein particulate matter and combining it with specific types of rice such as long grain, medium or short grain, brown, unpolished or white rice, the combined ingredients are held in suspension without segregation until consumer use.

Unless otherwise stated or indicated in the following examples and throughout are rest of the specification and in the claims, all percentages, parts and portions are expressed on a weight basis, based on total composition. The following examples are intended to be further illustrative of the invention and not limitative thereof.

EXAMPLE 1

The starting material is flakes of dehulled, solvent-extracted, soybean having a moisture content of 7.5 percent and an NSI of about 50 percent. The soybean flakes are processed in a "modified Anderson expeller" as described above.

The soybean flakes are preheated to about 180° F. in the preconditioning chamber. The retention time in the preconditioning chamber is 1 minute, and steam having a pressure of 65 p.s.i.g. is used in the steam jacket. The soybean flakes have a moisture content of 6.8 percent upon exiting from the preconditioning chamber and are passed through the vertical force feeder into the main horizontal pressing chamber. The processing retention time (time during which the pressure is applied) is 2 minutes: the pressure applied is 2000 p.s.i. and the thickness of the cake is about ⅜ inch. The cake during the pressing has a temperature of 305° F. The exiting cake has a moisture content of 5.5 percent, is allowed to cool and is fragmented by means of chopping blades into chunks. The chunks have a light yellowish brown or buff color and are not porous in appearance.

The chunks are separated by screens to give retained chunks having a chunk size that passes through a 1-inch screen and stays on a ½ inch screen. The compacted chunks have an analysis (weight percent on a dry basis) as follows:

TABLE 1

|  | Compacted chunks |
|---|---|
| Protein (N×6.25) | 53.5 |
| Fat | 1.2 |
| Fiber | 4.0 |
| Ash | 6.7 |
| Carbohydrate (difference) | 34.6 |

The noted calculation basis for the protein is N×6.25, wherein N is the value obtained by an analysis for protein nitrogen using the Kjeldahl Test and 6.25 is the standard factor for soy to get total protein.

The following is the amino acid profile for the compacted soybean chunks:

| Amino Acid | Percent |
|---|---|
| Lysine | 4.798 |
| Available Lysine | 4.421 |
| Histidine | 2.016 |
| Arginine | 5.664 |
| Aspartic Acid | 9.142 |
| Threonine | 2.882 |
| Serine | 3.977 |
| Glutamic Acid | 14.230 |
| Proline | 3.996 |
| Glycine | 3.293 |
| Alanine | 3.546 |
| Cystine, Half | Trace |
| Valine | 3.038 |
| Methionine | 1.281 |
| Isoleucine | 2.732 |
| Leucine | 4.858 |
| Tyrosine | 2.455 |

-continued

| Amino Acid | Percent |
|---|---|
| Phenylalanine | 3.614 |

The following is the vitamin analysis for the compacted soybean chunks:

| Vitamins | Amounts |
|---|---|
| Thiamin | 3.49 mgs per lb. |
| Riboflavin | 2.18 mgs per lb. |
| Niacin | 8.17 mgs per lb. |
| Vitamin $B_6$ | 2.27 mgs per lb. |
| Vitamin $B_{12}$ | None detected |

The protein efficiency ratio of the compacted chunks is 87 percent of that for casein.

The following is the mineral analysis for the compacted soybean chunks:

| Mineral | Amount |
|---|---|
| Calcium | 0.216 percent |
| Phosphorous | 0.660 percent |
| Potassium | 0.230 percent |
| Magnesium | 0.280 percent |
| Iron | 90.5 ppm |
| Copper | 15.0 ppm |
| Manganese | 20.0 ppm |
| Zinc | 81.0 ppm |
| Sodium Chloride | 0.222 percent |
| Cobalt | 0.033 ppm |
| Iodine | Less than 0.14 ppm |

The density of the soy protein was controlled by varying the degree of compactness in the "modified Anderson expeller." The degree of compactness is accomplished by controlling the choke mechanism of the expeller which is mounted on the cake outlet space to increase or decrease the internal pressure along the expeller screw. The degree of compactness can be adjusted to provide a bulk density of the cake of substantially that of rice.

Subsequently, a mixture can be prepared of rice and soy protein in a ratio of about 4:1 by placing the ingredients in a Hobart mixer equipped with an anchor type agitator.

After mixing is complete a sample of the mixture is subjected to a densification test which is accomplished by filling a 100 ml graduated cylinder therewith and tamping fifty times. Visual observations of the distribution patterns of the ingredients of the mixture will indicate no separation of the soy protein granules from the rice granules.

EXAMPLE 2

Solvent-extracted soy flakes are processed in a "modified Anderson expeller" under a series of pre-established operations to obtain the desired cake as an exit product from the expeller. The cake is allowed to cool and is fragmented by means of chopping blades into granules. The granules are further separated using a sifter to give retained granules having a size that passes through a U.S. S/S #5 screen and remains on a U.S. S/S #16 screen.

The bulk density of the soy protein was obtained by varying the degree of compactness in the "modified Anderson expeller." The degree of compactness is accomplished by controlling the choke mechanism of the expeller which is mounted on the cake outlet space to increase or decrease the internal pressure along the expeller screw.

The bulk density of the soy protein granules obtained was 36.0 lbs. per cu. ft.

A mixture of 15.0 pounds of rice having a density of 32 lbs. per cu. ft. and 5.0 lbs. of the soy protein granules having a size and shape similar to rice were mixed in a Hobart mixer with an anchor type agitator. After mixing was complete a sample of the mixture was subjected to a densification test by filling a 100 ml graduated cylinder therewith and tamping gently fifty times. Visual observations were made on the distribution patterns of the ingredients of the mixture. No separation of the soy protein granules from the rice granules was observed.

The present invention is equally applicable to the protein enrichment and fortification of other grain materials, such as wheat, barley, buckwheat, bulgar, groat, hominy grits, cassava, tapioca and the like.

EXAMPLE 3

Soy protein granules were prepared in the manner as described in Example 1 having a density of 44 lbs. per cubic foot. The granules were of a size and shape of wheat granules and were mixed at the rate of 5 lbs. of the soy protein granules with 15 lbs. of wheat having a density of 48 lbs. per cubic foot. After mixing was complete, a sample of the mixture was subjected to a densification test as described above. Visual observations were made on the distribution patterns of the ingredients of the mixture. No separation of soy protein granules from the wheat granules was observed.

EXAMPLE 4

Soy protein granules were prepared in the manner as described in Example 1 having a density of 40 lbs. per cubic foot. The granules were of a size and shape of barley granules and were mixed at the rate of 5 lbs. of the soy protein granules with 15 lbs. of barley having a density of 39 lbs. per cubic foot. After mixing was complete, a sample of the mixture was subjected to a densification test as described above. Visual observations were made on the distribution patterns of the ingredients of the mixture. No separation of soy protein granules from the barley granules were observed.

EXAMPLE 5

Soy protein granules were prepared in the manner as described in Example 1 having a density of 40 lbs. per cubic foot. The granules were of a size and shape of buckwheat granules and were mixed at the rate of 5 lbs. of the soy protein granules with 15 lbs. of buckwheat having a density of 40 lbs. per cubic foot. After mixing was complete, a sample of the mixture was subjected to a densification test as described above. Visual observations were made on the distribution patterns of the ingredients of the mixture. No separation of soy protein granules from the buckwheat granules was observed.

What is claimed is:

1. A method of preparing a protein-enriched grain food product of substantially uniform density and hydration properties in the dry state composed of particulate soy protein and grain wherein the particulate soy protein particles have a density substantially equivalent to that of the grain whereby the protein-grain product can be packaged and transported without segregation of the product mix and hydration properties whereby preparation of the product for consumption is uniform and resembles that of said grain, said method comprising the steps of:
(a) subjecting a soybean feed material selected from the class consisting of solvent-extracted meal, grits and flakes of soybean material having an NSI of about 30 to about 70 and containing moisture, to a mechanical pressure of at least 1800 pounds per square inch for a time and at a temperature sufficient to convert said moisture into steam whereby said soybean feed is partially disembittered, toasted without scorching and is compacted at a degree of compactness sufficient to compact said feed into a hard and substantially fused mass having a density and hydration properties substantially equivalent to that of the grain;
(b) fragmenting said mass into chunks and
(c) mixing said chunks with the grain whereby there is obtained a soy protein enriched-grain food product of substantially uniform density and hydration properties.

2. The method of claim 1 wherein the grain is rice.

3. The method of claim 1 wherein the soybean feed material is heated before step (a) so that the moisture content thereof is reduced to between about 6 and about 8 percent by weight.

4. The method of claim 1 wherein the soybean feed material has a protein content of 30 weight percent or more.

5. The method of claim 4 wherein the soybean feed material has an NSI of 45–60.

6. The method according to claim 1 wherein a pressure between 2000 and 5000 pounds per square inch is applied in step (a) at a temperature between about 150° and about 200° C.

7. The method according to claim 1 wherein the soybean feed material is subjected to heat and pressure in step (a) from 1.5 to 5 minutes.

8. The method according to claim 1 wherein said mass is fragmented in step (b) into chunks which will pass through a 1-inch opening screen and be retained on a ¼ inch opening screen.

9. The method according to claim 1 wherein said mass is fragmented in step (b) into chunks which will pass through a U.S. S/S #5 screen and be retained on a U.S. S/S #16 screen.

10. The method according to claim 2 wherein said mass in step (b) is fragmented into chunks simulating the size and shape of rice.

11. A protein-enriched rice food product of substantially uniform density and hydration properties in the dry state composed of particulate soy protein and rice wherein the particulate soy protein particles have a density substantially equivalent to that of rice whereby the protein-rice product can be packaged and transported without segregation of the ingredients of the product mix and hydration properties whereby preparation of the product for consumption is uniform and resembles that of rice and produced by the process of claim 1.

12. The product according to claim 11 wherein the soy protein particles simulate rice as to size and shape.

13. A protein-enriched grain food product of substantially uniform density and hydration properties in the dry state composed of particulate soy protein and a grain wherein the particulate soy protein particles have a size, shape and density substantially equivalent to that of the grain whereby the protein-grain product can be packaged and transported without segregation of the ingredients of the product mix and hydration properties whereby preparation of the product for consumption is uniform and resembles that of said grain and produced by the process of claim 1.

14. The product according to claim 13 wherein said grain is wheat.

15. The product according to claim 13 wherein said grain is buckwheat.

16. The product according to claim 13 wherein said grain is barley.

17. The method of claim 1 wherein the soybean feed material in step (a) is fortified by addition of a supplement selected from the group consisting of vitamins, minerals and mixtures thereof.

18. The product according to claim 11 wherein said soy protein particles are fortified with a supplement selected from the group consisting of vitamins, minerals and mixtures thereof.

19. The product according to claim 13 wherein said soy protein particles are fortified with a supplement selected from the group consisting of vitamins, minerals and mixtures thereof.

* * * * *